United States Patent
Scherer et al.

(10) Patent No.: US 6,314,686 B1
(45) Date of Patent: Nov. 13, 2001

(54) LIGHT SEAL FOR USE WITH ROBOTIC EQUIPMENT

(75) Inventors: Timothy A. Scherer, Davenport; Douglas H. Juhl, Eldridge, both of IA (US)

(73) Assignee: Genesis Systems Group, Ltd., Davenport, IA (US)

( * ) Notice: Subject to any disclaimer, the term of this patent is extended or adjusted under 35 U.S.C. 154(b) by 0 days.

(21) Appl. No.: 09/492,443

(22) Filed: Jan. 27, 2000

Related U.S. Application Data

(60) Provisional application No. 60/171,061, filed on Dec. 16, 1999.

(51) Int. Cl.$^7$ .................................................. A47F 10/00
(52) U.S. Cl. ................. 52/36.1; 52/32; 52/79.1; 219/121.86; 219/121.82; 219/121.21; 219/121.22
(58) Field of Search ............................ 52/36.1, 32, 79.1; 219/121.86, 121.82, 121.21, 121.22

(56) References Cited

U.S. PATENT DOCUMENTS

| | | |
|---|---|---|
| 3,775,586 | 11/1973 | Flint et al. . |
| 4,205,216 | 5/1980 | Douglas . |
| 4,617,446 | 10/1986 | Anderson . |
| 4,884,189 | 11/1989 | Kimura et al. . |
| 5,183,993 | 2/1993 | Sato et al. . |
| 5,464,963 * | 11/1995 | Hostler et al. ................... 219/121.82 |
| 5,591,361 * | 1/1997 | Hostler et al. ................... 219/121.82 |
| 5,643,477 * | 7/1997 | Gullo et al. ...................... 219/121.86 |
| 5,658,476 * | 8/1997 | Gullo et al. ...................... 219/121.82 |
| 6,147,323 * | 11/2000 | Erickson et al. ................ 219/121.86 |

* cited by examiner

*Primary Examiner*—Carl D. Friedman
*Assistant Examiner*—Christy M. Syres
(74) *Attorney, Agent, or Firm*—Zarley, McKee, Thomte, Voorhees & Sease

(57) ABSTRACT

A light seal for use with robotic equipment includes a window having a divider panel rotatably mounted therein. Flexible sealing flaps at the opposite sides of the window opening engage the divider panel when the divider panel is in a sealed position to provide a light seal between the edges of the divider panel and the edges of the window opening.

11 Claims, 6 Drawing Sheets

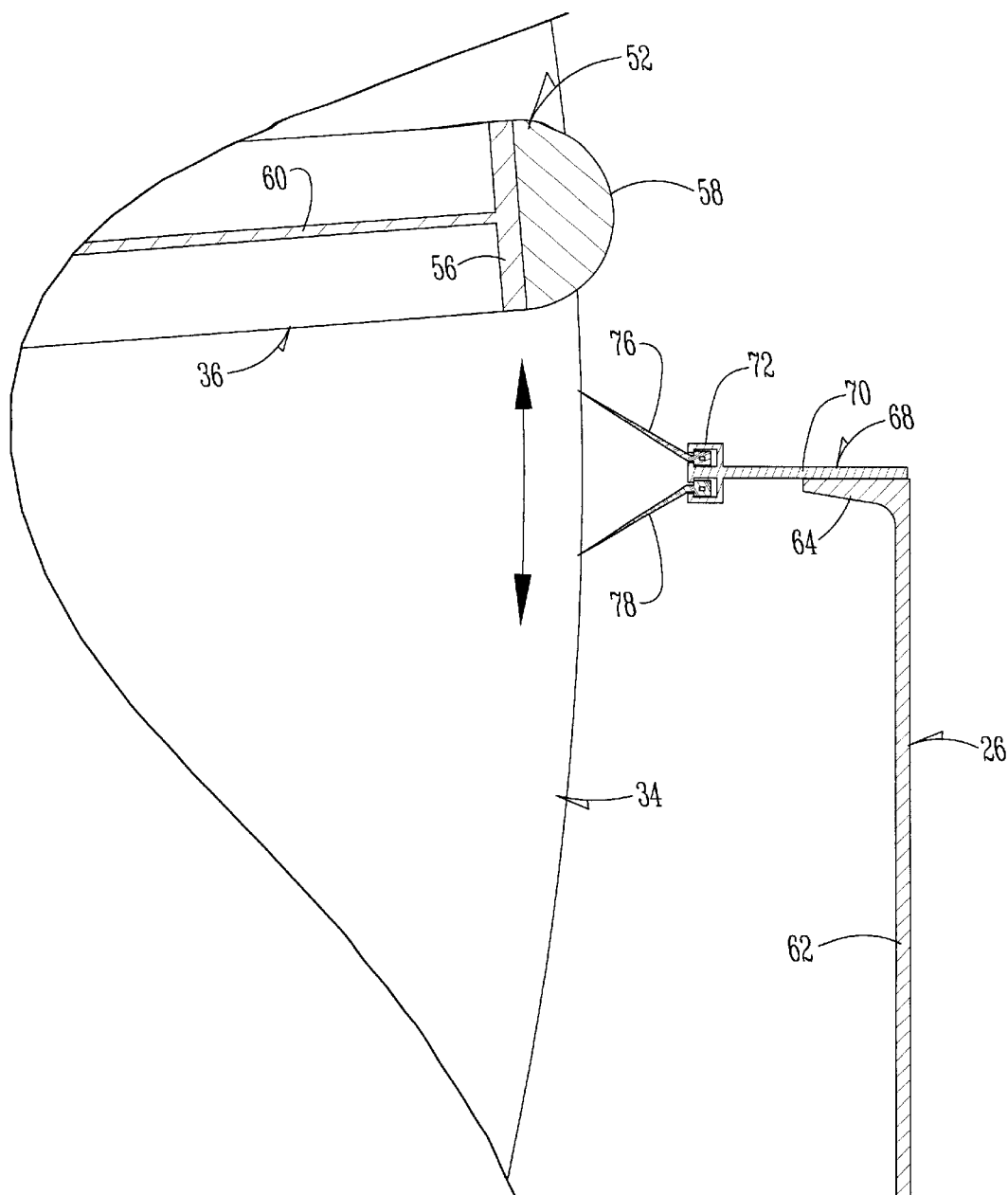
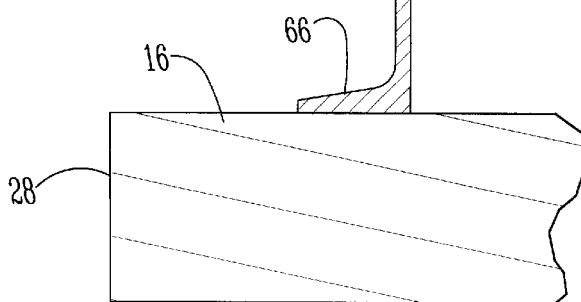

US 6,314,686 B1

LIGHT SEAL FOR USE WITH ROBOTIC EQUIPMENT

CROSS-REFERENCE TO RELATED APPLICATIONS

This application claims the benefit of U.S. Provisional Application No. 60/171,061 filed Dec. 16, 1999.

BACKGROUND OF THE INVENTION

The present invention relates to a light seal for use with robotic equipment. A sealing arrangement has been needed for a laser enclosure containing robotic laser welding equipment. Such enclosures usually include a display table which may be indexed to several positions moving a plurality of work pieces to a workstation within the enclosure for being operated upon by the robotic laser welding system. In order to protect the eyes of persons working around the enclosure it is desirable to have a "light tight" seal between the enclosure and the indexing table. "Light tight" refers to a seal that prevents a direct line of sight into the enclosure where the laser welding system is operating.

Therefore, a primary object of the present invention is the provision of an improved light seal for use with robotic equipment.

A further object of the present invention is the provision of an improved light seal which utilizes flexible seals that block light and create a "light tight" enclosure.

A further object of the present invention is the provision of an improved light seal that utilizes a double flap seal which provides two sealing surfaces for providing a "light tight" seal.

A further object of the present invention is the provision of an improved light seal which can easily be removed and replaced when it becomes worn or damaged.

A further object of the present invention is the provision of an improved light seal which is economical to manufacture, durable in use, and efficient in operation.

SUMMARY OF THE INVENTION

The foregoing objects may be achieved by a light seal comprising a window frame forming a window opening and having at least a first side frame member positioned adjacent the window opening. A sealing member is attached to the first side frame member. A divider panel includes at least a first side panel edge and is mounted within the window frame for rotation about a panel axis. The divider panel rotates to about the panel axis to a sealed position wherein the first side panel edge is positioned adjacent the first side frame member and engages the sealing member. The sealing member creates a light seal between the first side panel edge and the first side frame member.

The divider panel is rotatable about the panel axis from its sealed position to an unsealed position wherein the first side panel edge is free from engagement with the sealing member. The sealing member comprises a flexible material having a normal shape and which flexes and bends away from that normal shape in response to movement of the divider panel to its sealed position. The sealing member flexes and returns to its normal shape in response to movement of the divider panel to its unsealed position.

According to another feature of the invention the window frame comprises a second side frame member and the divider panel comprises a second side panel edge. A flexible second sealing member is attached to the second side frame member and engages the second side panel edge to create a light seal therebetween when the divider panel is in its sealed position.

According to another feature of the invention the divider panel and the first and second sealing members substantially fill the window opening to prevent light from passing through the window when the panel is in its sealed position.

According to another feature of the invention the panel is rotatable about its panel axis from the first mentioned sealed position to a second sealed position wherein the first panel edge is adjacent the second side frame member and is engaged by the second seal member and the second panel side edge is adjacent the first side frame member and is engaged by the first seal member.

According to another feature of the invention the first sealing member comprises first and second flexible flaps both of which engage the first panel side edge when the divider panel is in its sealed position.

According to another feature of the invention the first and second flexible flaps each comprise in cross section a flap tip. The flap tip of the first flap member and the flap tip of the second flap member both engage the first panel side edge.

According to another feature of the invention an elongated extruded member is attached to the first side frame member and retentively attaches the first and second flap members of the first sealing member to the first side frame member.

BRIEF DESCRIPTION OF THE FIGURES OF THE DRAWINGS

FIG. 4A is a view similar to FIG. 4, but showing the divider panel free from engagement with the light seal.

DETAILED DESCRIPTION OF THE PREFERRED EMBODIMENT

Figure 1:
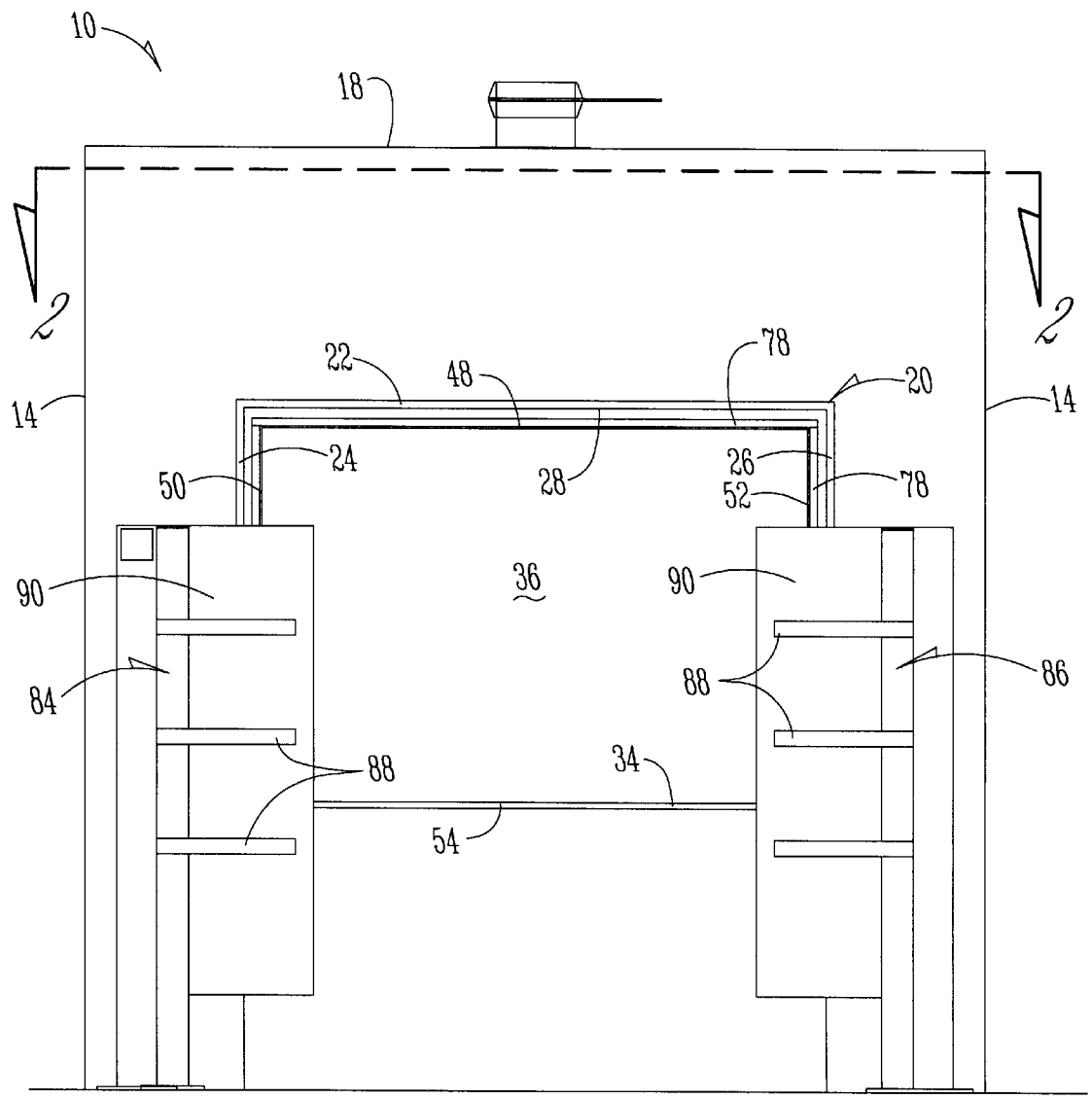
FIG. 1 is a front elevational view of the present invention.
Figure 2:
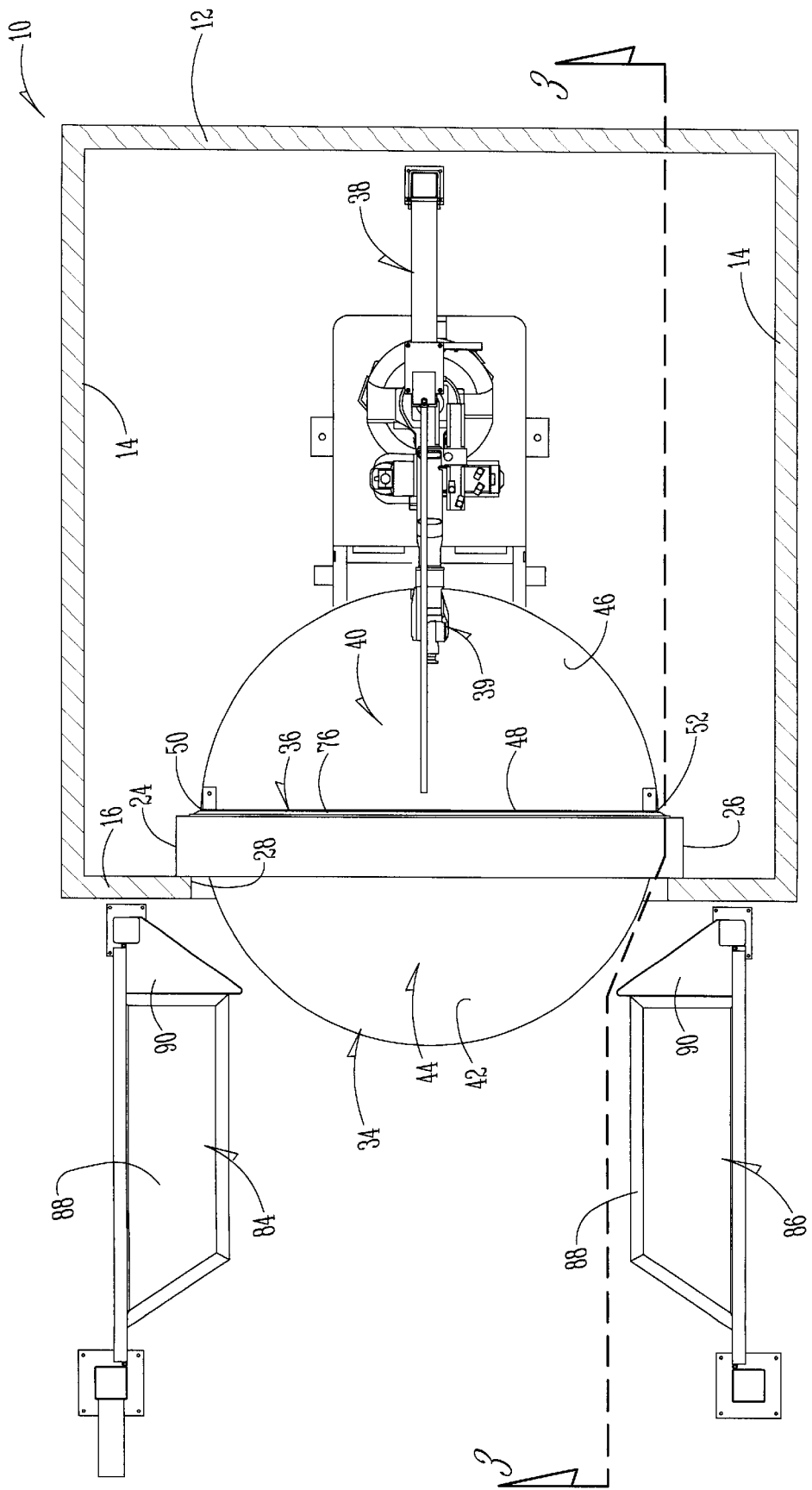
FIG. 2 is a sectional view taken along line 2—2 of FIG. 1.
Figure 3:
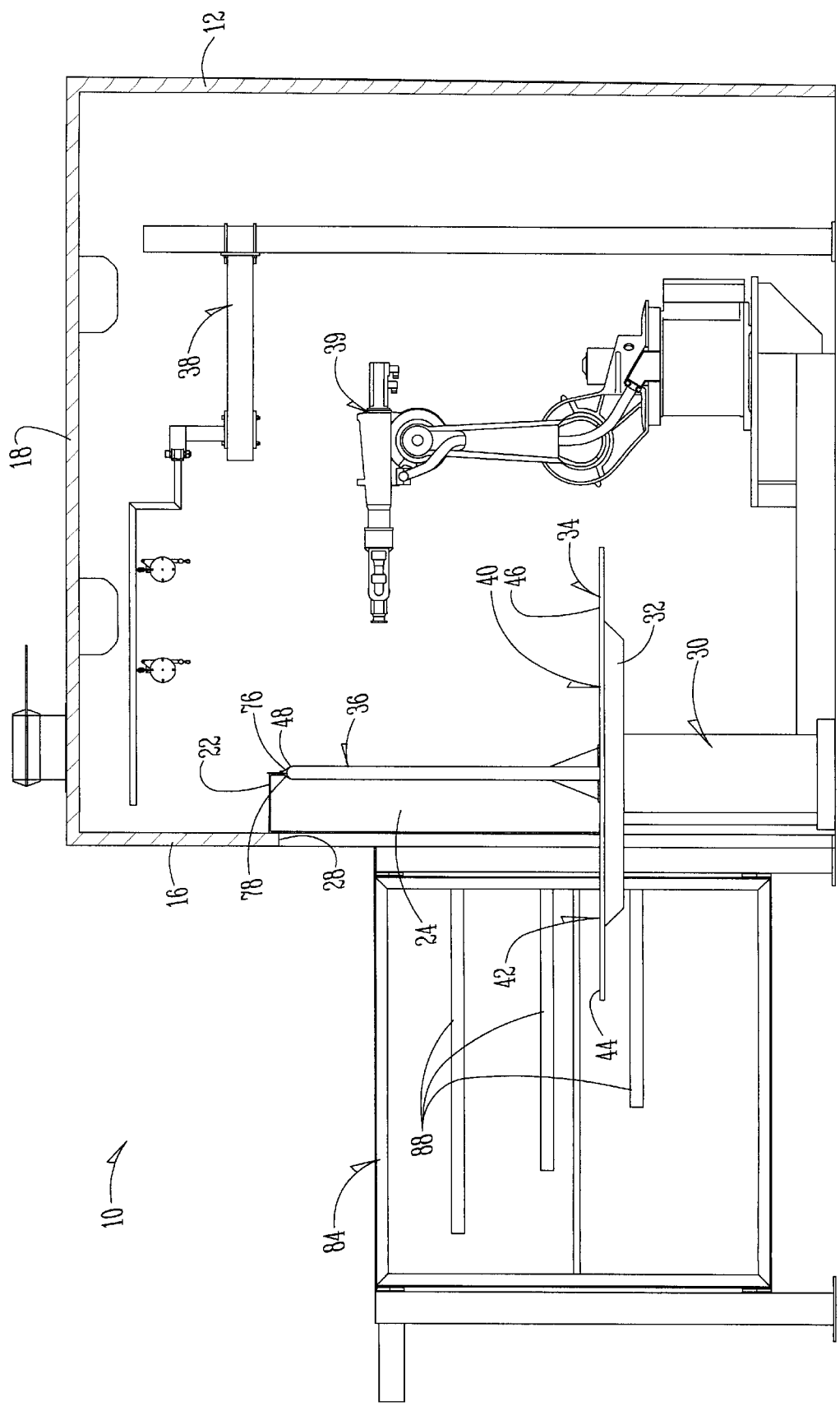
FIG. 3 is a sectional view taken along line 3—3 of FIG. 2.

Referring to the drawings the numeral 10 generally designates a work enclosure of the present invention. Enclosure 10 includes a rear wall 12, side walls 14, a front wall 16 and a top wall 18. Front wall 16 is provided with a window frame 20 comprising a top frame member 22, and two side frame members 24, 26 which define a window opening 28.

Mounted within the window opening 28 is a turret pedestal 30 which supports at its upper end a table frame 32 and which is capable of rotating the table frame 32 about a vertical axis within window opening 28. Supported on the table frame 32 is a table 34 having a divider panel 36 extending upwardly therefrom across the diameter of the circular table 34.

Within the enclosure 10 is a support frame 38 which is adapted to support equipment such as robotic tools or other instruments used within enclosure 10. Also mounted within the enclosure 10 is a robot 39.

The numeral 40 generally designates a work station within the enclosure 10 where a work piece may be indexed to be operated upon by the robot 39. On the opposite side of panel 36 is a load station designated generally by the numeral 42. Table 34 includes a first support surface 44 and a second support surface 46 adapted to support a work piece which may be indexed from the load station 42 to the work station 40. Indexing occurs by rotating the table 34 about its vertical axis provided by turret 30.

Divider panel 36 includes a top edge 48, side edges 50, 52, and a bottom edge 54 which is attached to the upper surface of table 34 and which divides table 34 into the two support surfaces 44, 46.

Figure 4:
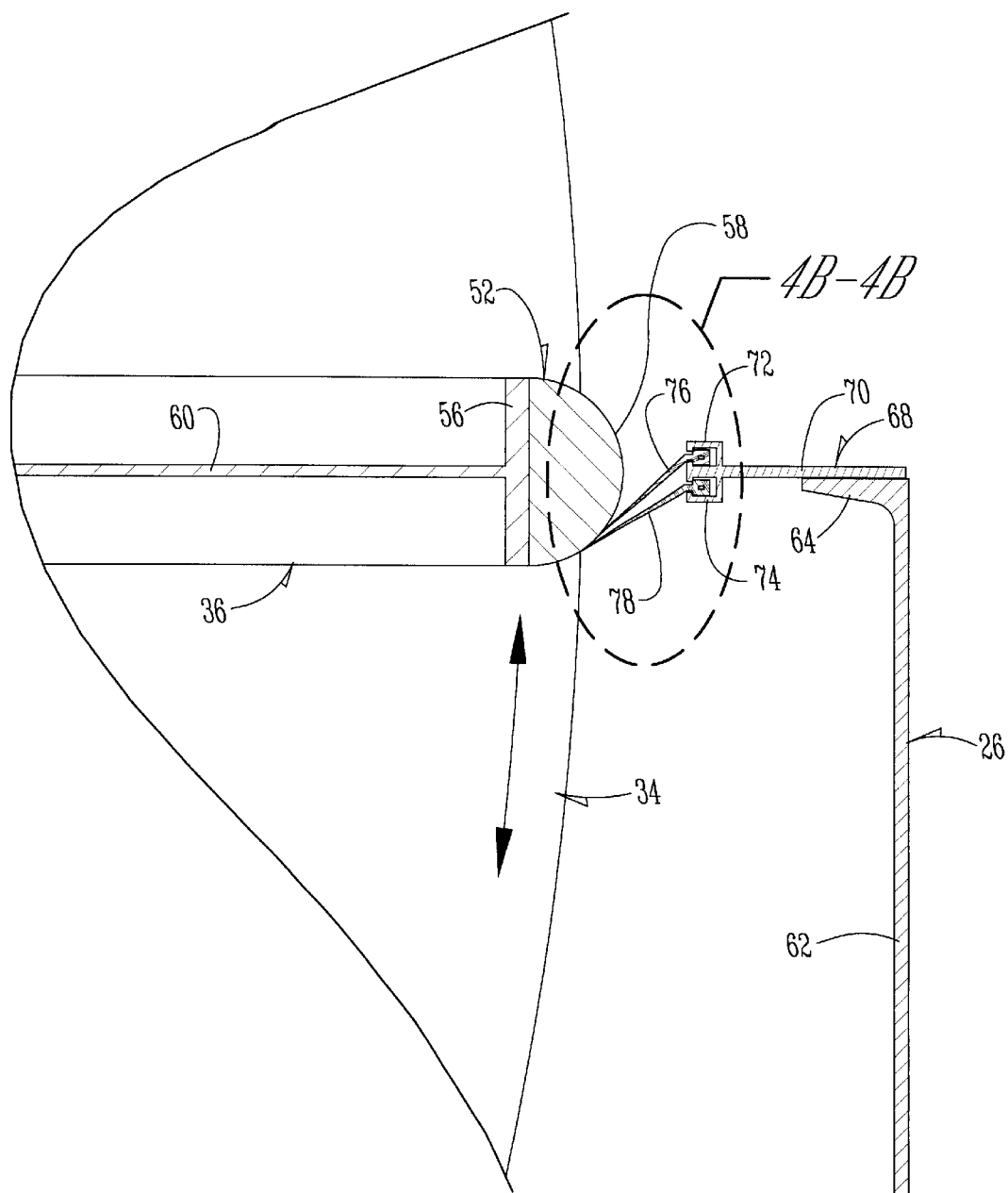
FIG. 4 is an enlarged detailed sectional view of the light seal adjacent one edge of the divider panel of the present invention.

Referring to FIGS. 4 and 4A, the side edge 52 of divider panel 36 comprises an edge plate 56 having an edge round bar 58 operatively attached thereto. A panel web 60 extends across the panel from side edge 52 to the opposite side edge 50.

Figure 4B:
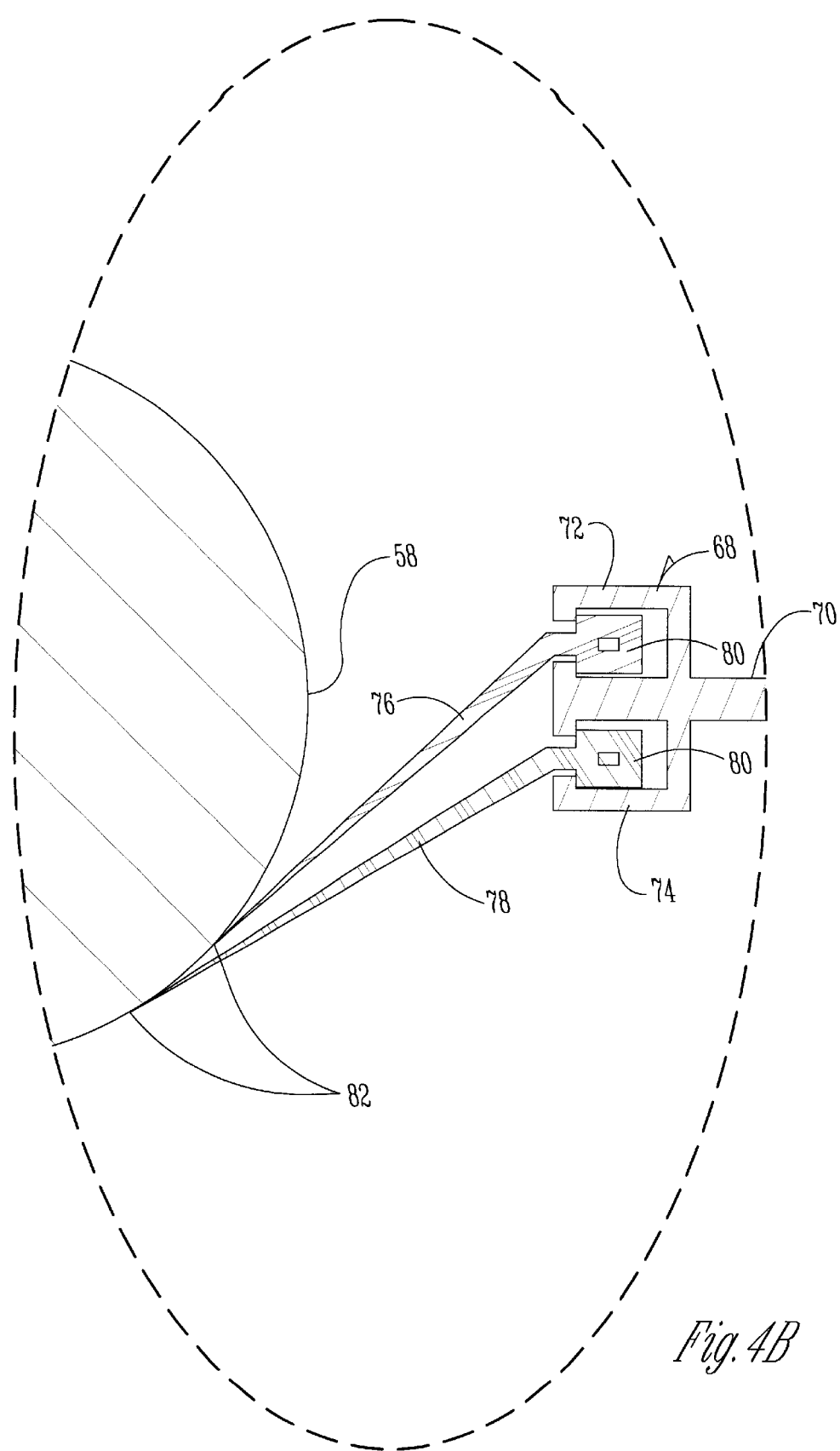
FIG. 4B is an enlarged detailed view taken along 4B—4B of FIG. 4.

FIG. 4 also shows the side frame 26 in cross section. Side frame 26 includes a frame web 62, an inner edge 64 and an outer edge 66. The outer edge 66 is attached to front wall 16 and the inner flange 64 is attached to an extruded aluminum seal holder 68. Holder 68 comprises in cross section a holder plate 70 which is attached to inner flange 64 of side frame 26. On the inner end of holder plate 70 are two holder channels 72, 74 which are generally C-shaped in cross section. Fitted within the holder channels 72, 74 are two flexible sealing flaps 76, 78. FIG. 4B shows the detail of flaps 76, 78 which each include an enlarged base 80 and a flexible tip 82.

FIG. 4 illustrates the divider panel 36 in its sealed position. In that sealed position, both of the flaps 76, 78 engage the round bar 58 of panel edge 52. The movement of the edge 52 against the flaps 76, 78 causes them to deflect, and because the tips of both of the flaps 76, 78 engage the round bar 58, there is a light seal provided between the side frame member 26 and the edge 52 of panel 36.

While not shown in the drawings, when the panel 36 is in the position shown in FIG. 4, the opposite edge 50 of panel 36 is similarly engaged by the flaps 76, 78 attached to the opposite side frame member 24.

FIG. 4A illustrates the movement of the panel 36 away from its sealed position. In this position the bar 58 no longer engages the flaps 76, 78 and the flaps 76, 78, because of their flexible resiliency, return to their normal positions shown in FIG. 4A.

The indexing of the table is preferably reciprocating in nature. The table reciprocates from a first position such as shown in FIG. 4 wherein the edge 52 is adjacent the side frame member 26. The panel 36, end table 34 can then be indexed to a second position wherein the edge 52 is adjacent the side frame member 24, and the edge 50 is adjacent the side frame member 26. In this second position the operator can load a work piece at load station 42 on to the work table 34. When the table is indexed again the work piece is indexed to the work station 40 for operation upon by the robot 39.

Positioned in front of the window opening 28 are a left-hand shelving system 84 and a right-hand shelving system 86. The shelving systems each include a plurality of shelves 88. A pair of vertical shield panels 90 are provided adjacent the front of the shelves systems 84, 86 to provide further protection of the worker from light which might inadvertently pass through the window opening 28. Should the sealing flaps 76, 78 become damaged or worn, they can be easily replaced. To replace them all that is necessary is to slide them out of the channels 72, 74 and insert new flexible sealing flaps.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A light seal assembly comprising:

a window frame forming a window opening and comprising at least a first side frame member positioned adjacent said window opening;

a first seal holder attached to said first side frame member;

a first sealing member comprising in cross section a base portion attached to said first seal holder and a first flexible tip extending from said first base portion toward said window opening;

said first flexible tip of said first sealing member being free from engagement with said first seal holder and being made of a flexible material that is capable of bending to swing said first flexible tip relative to said first base portion from a normal position to a first deflected position;

a divider panel having a first panel edge and being mounted within said window frame for rotation from an unsealed position spaced from said first sealing member to a sealed position engaging said first flexible tip of said first sealing member and causing said first flexible tip to bend relative to said first base portion from said normal position to said deflected position;

said first sealing member providing a light seal between said side frame member and said divider panel when said divider panel is in said sealed position;

said first flexible tip having resiliency which causes it to return to said normal position when said divider panel moves to said unsealed position.

2. A light seal assembly according to claim 1 wherein;

said window frame comprises a second side frame member and said divider panel comprises a second side panel edge;

a second seal holder being attached to said second side frame member;

a second sealing member having a second base portion attached to said second seal holder and a second flexible tip extending from said second base portion toward said window opening;

said second flexible tip being free from engagement with said second seal holder and being made of a flexible material that is capable of bending to swing said second flexible tip relative to said second base portion from a normal position to a first deflected position;

said second flexible tip engaging said second side panel edge to create a light seal there between when said divider panel is in said sealed position.

3. A light seal assembly according to claim 2 wherein said first and second base portions are substantially stationary and said first and second flexible tips swing about said first and second base portions respectively when moving between their respective said normal and said first deflected positions.

4. A light seal assembly according to claim 2 wherein said first and second seal holders comprise first and second elongated members respectively, extending along said first and second side frame members respectively.

5. A light seal assembly according to claim 2 and further comprising a pair of said first sealing members attached to said first seal holder, each of said pair of said first sealing members comprising a first base portion connected to said first seal holder, and a first flexible tip extending from said first base portion into said window opening, said first flexible tips of said pair of said first sealing members forming a V-shaped configuration in cross section;

a pair of said second sealing members attached to said second seal holder, each of said pair of said second sealing members comprising a second base portion connected to said second seal holder and a second flexible tip extending from said base portion into said window opening, said second flexible tips of said pair of said second sealing members forming a V-shaped configuration in cross section.

6. A light seal assembly according to claim 5 wherein said first side panel edge of said divider panel engages both of said first flexible tips of said pair of said first sealing members when in said first sealed position, and said second side panel edge of said divider panel engages both of said second flexible tips of said pair of said second sealing members when in said first sealed position.

7. A sealed laser system comprising:

a work station and a load station positioned in spaced relation to one another;

a laser tool located at said work station;

a window frame between said work station and said load station and having a plurality of frame members forming a window opening, said frame members including a first side frame member and a second side frame member;

first and second sealing members, each having a base portion and a flexible tip, said base portions of said first and second sealing members being attached to said first and second side frame members, respectively;

said flexible tips of said first and second sealing members extending from said base portions into said window opening, and being flexible to bend and swing about said base portions from a normal position to a deflected position;

a divider panel having first and second panel side edges;

a pedestal supporting said divider panel within said window opening for rotation about a table axis from a first sealed position wherein said first and second side panel edges engage and bend said tips of said first and second sealing members respectively from their respective normal positions to their respective deflected positions;

said first sealing member forming a light seal between said first side panel edge of said first divider panel and said first side frame member of said window frame when said divider panel is in said first sealed position;

said second side frame member forming a light seal between said second side panel edge of said divider panel and said second side frame member of said window frame when said divider panel is in said first sealed position.

8. A sealed laser system according to claim 7 wherein said divider panel is positioned on a work table surface and divides said work table surface into first and second work piece surfaces.

9. A sealed laser system according to claim 7 wherein each of said flexible tips of said first and second sealing members are movable to swing away from said first deflected position back to said normal position and then to a second deflected position; said pedestal being pivotal to move said divider panel to a second sealed position wherein said second side panel edge engages and moves said flexible tip of said first sealing member to its respective second deflected position and said first side panel edge engages and moves said flexible tip of said second sealing member to its respective second deflected position.

10. A light seal assembly comprising:

a window frame forming a window opening and comprising at least a first side frame member positioned adjacent said window opening;

a sealing member comprising in cross section a base portion attached to said first side frame member and a flexible tip extending from said base portion toward said window opening;

said flexible tip of said sealing member being comprised of a flexible material capable of bending to swing said flexible tip in one direction relative to said base portion from a normal position to a first deflected position, said flexible tip being capable of bending relative to said base portion in another direction from said normal position to a second deflected position different from said first deflected position;

a divider panel having a first panel edge and an opposite second panel edge and being mounted within said window frame for rotation from a first sealed position wherein said first panel edge engages said flexible tip and moves said flexible tip to said first deflected position, to a second sealed position wherein said second panel edge engages said flexible tip and moves said flexible tip to said second deflected position;

said sealing member providing a light seal between said side frame member and said divider panel when said divider panel is in either of said first or said second sealed positions.

11. A light seal assembly comprising:

a window frame forming a window opening and comprising at least a first side frame member positioned adjacent said window opening;

a first pair of sealing members each comprising in cross section a base portion attached to said first side frame member and a flexible tip extending from said base portion toward said window opening, said flexible tips of said first pair of sealing members forming a V-shaped configuration with one another;

said flexible tips of said pair of sealing members being comprised of a flexible material capable of bending to swing said flexible tips in one direction relative to said base portion from a normal position to a first deflected position, said flexible tips being capable of bending relative to said base portion in another direction from said normal position to a second deflected position different from said first deflected position;

a divider panel having a first panel edge and an opposite second panel edge and being mounted within said window frame for rotation from a first sealed position wherein said first panel edge engages said flexible tips of said pair of seal members and moves said flexible tips to said first deflected position;

said divider panel being capable of rotating to a second sealed position wherein said second panel edge engages said flexible tips of said pair of seal members and moves said flexible tips to said second deflected position;

said pair of sealing members providing a light seal between said side frame member and said divider panel when said divider panel is in either of said first or said second sealed positions.

* * * * *